Figure 1:
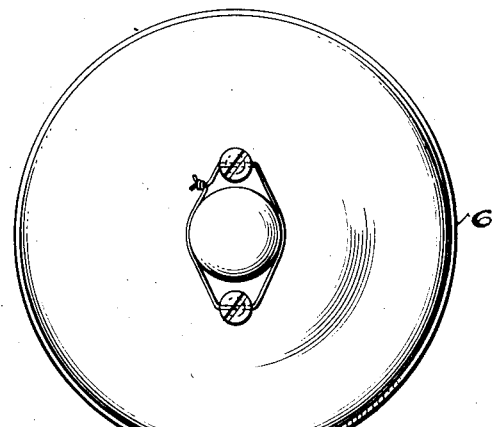

Oct. 19, 1943.  J. W. ALLEN  2,332,126
ELECTRICAL APPARATUS
Filed July 30, 1941

Inventor
Joseph W. Allen.
By Martin J. Finnegan.
Attorney

Patented Oct. 19, 1943

2,332,126

UNITED STATES PATENT OFFICE 2,332,126

ELECTRICAL APPARATUS

Joseph W. Allen, East Orange, N. J., assignor to Bendix Aviation Corporation, South Bend, Ind., a corporation of Delaware Application July 30, 1941, Serial No. 404,739

1 Claim. (Cl. 171—252)

This invention relates to electrical apparatus and more particularly to means for generating electrical power.

One of the objects of the invention is to provide a novel housing and mounting means for a dynamo electric machine and associated apparatus. When applied to the power generating equipment for the radio and other apparatus used on airplanes, the invention provides means whereby the machine which generates current for use in the thermionic tubes of the radio set may be supported on and by the portion of the mechanism which houses the output regulating and current filtering means, as for example, condenser, choke coils, shielding and circuit controlling mechanism.

It is common practice for aircraft to carry a generator capable of energizing either or both the filament and plate elements of the vacuum tubes of a radio set, and in order to maintain the source of this energy reasonably free from alternating current components, and also at substantially constant voltage during the period required for transmission or receipt of messages, it is customary to employ various regulating and filtering devices, which must be housed and supported in one or more units additional to the unit constituted by the dynamoelectric machine itself. As a result it is necessary to provide suitable supports upon the plane for each of these units, as well as the necessary space therefor.

The paucity of unutilized space on aircraft, as well as the necessity for keeping the weight increments due to auxiliary apparatus within a minimum figure, has heretofore caused the adoption of the practice of combining the generator and associated control unit in such a manner that the generator is supported entirely on and by the control unit, so that the only support which it is necessary to provide on the frame itself is a single support or base to receive the base of the control unit.

The present invention provides means whereby, when such a combined generator and control unit are mounted one upon the other in the manner illustrated in McNeil Patent 1,996,734, granted April 2, 1935, a certain amount of resiliency will be obtained. In the illustrated embodiment this resiliency results from use of a hollow, flexible cradle as the generator supporting element, said cradle being of corrugated metallic tubing material; and as this metallic tubing also receives the wires constituting the electrical connections of the generator, and is bonded at its upper edges to the generator housing and at its lower edges to the control unit housing—both of which housings are metallic— the said resilient supporting cradle also serves as an electrostatic shield to interrupt electrical emanations of radio frequency, thus providing protection of the adjacent radio equipment against interference from the generator and control circuits. It is to be understood, however, that the illustrated embodiment is not definitive of the limits of the present invention; the said limits being defined only in the appended claim.

Figure 2:
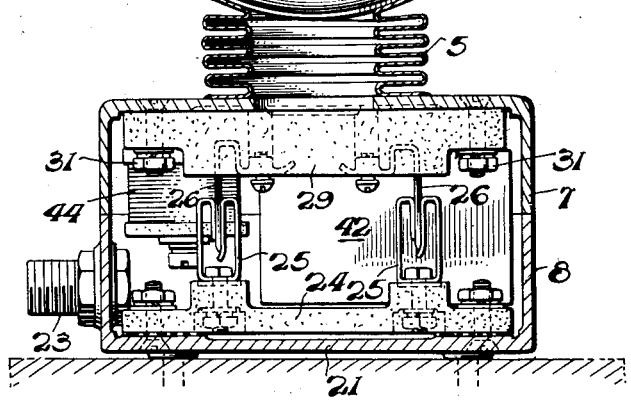
Figure 2:
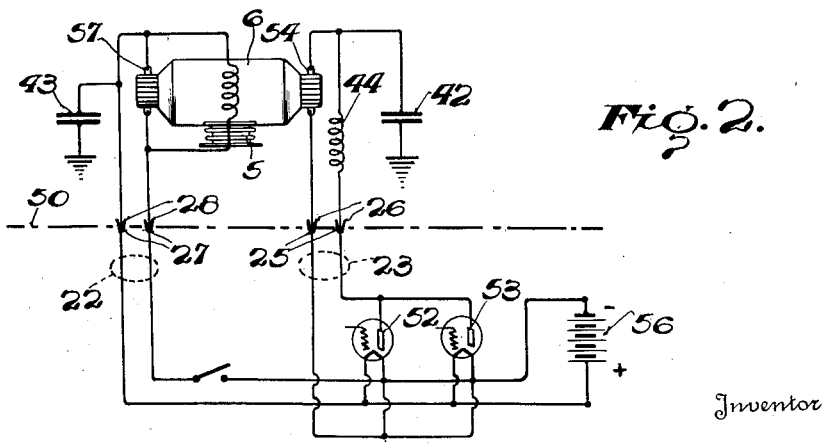

In the drawing:

Fig. 1 is a view, partly in elevation and partly in transverse section of the preferred embodiment of the invention; and Fig. 2 is a schematic representation of the electrical connections for said embodiment.

Referring to the drawing, the invention is shown as embodied in a corrugated, flexible metallic tubing 5 electrically bonded to a dynamotor 6 of substantially cylindrical outline, and similarly bonded to the upper half 7 of a control unit 7, 8; said upper half being removably secured to the lower half 8.

As shown, the lower half 8 of the control unit includes a base portion 21 permanently secured to the frame of the engine or fuselage of the craft, inlet and outlet plugs 22 and 23 respectively, a terminal board 24 of insulation material, a plurality of switch plates 25 and 27 mounted at either end of said terminal board, and a corresponding number of switch blades 26 and 28 embedded in a second terminal board 29 secured to the upper detachable portion 7 of the control unit in proper position to align with and engage the switch plates 25. As shown the upper terminal board 29 is held by suitable fastening means 31 to the upper section 7 of the box, and this upper section is also centrally apertured to allow passage of the wires that deliver current to, and receive current from, the dynamotor.

The receptacle 7, 8 may include condenser units 42 and 43, a choke coil 44, and additional electrical units (not shown) for regulating the output of the dynamotor 6, as for example, additional filters, resistance units or voltage regulators.

When the dynamoelectric machine is of the dynamotor type, as shown, it is preferably energized from a battery 56 (Fig. 2) or other suitable relatively low voltage source, and in turn supplies current at a considerably higher voltage to a load 52, 53, the electrical connections being as indicated in Fig. 2. Also in Fig. 2 reference character 50 designates a dividing line between the electrical parts which are detachable when the upper section 7 of the receptacle is removed, the parts indicated below the reference line 50 being those which are not so removable, as for example, the outlets 22 and 23, the fixed terminals 25 and 27, and the radio tubes 52, 53 in circuit with the brushes 54 on the generator side of the dynamotor 6. In the embodiment shown battery 56 supplies energy to heat the filaments of the radio tubes 52, 53 as well as supplying the current to energize the motor end 57 of the dynamotor 6.

It will be noted that the electrical parts are completely enclosed in a metal covering so that the whole constitutes a completely shielded system, thus protecting the adjacent radio equipment against inductive radiation. Tubing 5 constitutes an integral part of this radio shielding, as well as being a shock-absorbing and vibration-damping mounting for the dynamotor.

Other details of the dynamotor 6 have not been shown as it is to be understood that this unit may be of any desired construction, or may be replaced by a generator driven mechanically from the associated engine, instead of in the manner indicated in Fig. 2.

Although the embodiment of the invention herein shown is of considerable practical merit for many reasons, including those above enumerated, it is to be understood that the invention is not limited to the incorporation of the details shown, nor is it limited to the use herein suggested, except insofar as limitations in these respects are expressed in the appended claim.

What is claimed is:

In a device of the class described, a terminal casing having upper and lower registering sections, said upper section being centrally apertured, a terminal block secured to each section, registering current conducting elements extending from each of said blocks toward the other, a dynamo electric machine in circuit with said current conducting elements, electrical connections from one of said blocks to said machine, and a flexible, tubular supporting cradle for said machine, said cradle being in alignment with the central aperture in said upper casing section, for passage therethrough of said electrical connections.

JOSEPH W. ALLEN.